(12) United States Patent
Osakabe

(10) Patent No.: US 11,152,026 B2
(45) Date of Patent: *Oct. 19, 2021

(54) SUBSTRATE FOR MAGNETIC DISKS, AND MAGNETIC DISK

(71) Applicant: HOYA CORPORATION, Tokyo (JP)

(72) Inventor: Kinobu Osakabe, Tokorozawa (JP)

(73) Assignee: HOYA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/499,210

(22) PCT Filed: Jul. 2, 2018

(86) PCT No.: PCT/JP2018/025104
§ 371 (c)(1),
(2) Date: Sep. 27, 2019

(87) PCT Pub. No.: WO2019/004484
PCT Pub. Date: Jan. 3, 2019

(65) Prior Publication Data
US 2020/0027481 A1    Jan. 23, 2020

(30) Foreign Application Priority Data

Jun. 30, 2017  (JP) .............................. JP2017-129613

(51) Int. Cl.
*G11B 5/73* (2006.01)
(52) U.S. Cl.
CPC .......... *G11B 5/73921* (2019.05); *G11B 5/739* (2019.05); *G11B 5/73911* (2019.05); *G11B 5/73917* (2019.05); *G11B 5/73919* (2019.05)

(58) Field of Classification Search
None
See application file for complete search history.

(56) References Cited

U.S. PATENT DOCUMENTS

| | | | | |
|---|---|---|---|---|
| 4,882,236 A | * | 11/1989 | Smith | G11B 5/7315 |
| | | | | 428/652 |
| 5,626,943 A | * | 5/1997 | Tenhover | G11B 5/7325 |
| | | | | 427/128 |

(Continued)

FOREIGN PATENT DOCUMENTS

| | | |
|---|---|---|
| CN | 102820040 A | 12/2012 |
| CN | 104303230 A | 1/2015 |

(Continued)

OTHER PUBLICATIONS

International Search Report in PCT/JP2018/025104 dated Oct. 2, 2018.

(Continued)

*Primary Examiner* — Kevin M Bernatz
(74) *Attorney, Agent, or Firm* — Global IP Counselors, LLP

(57) ABSTRACT

A substrate for a magnetic disk includes a substrate main body having two main surfaces, and a film that is provided on the main surfaces and is made of a material having a loss factor of 0.01 or more. The substrate for a magnetic disk including the film has a thickness T of 0.700 mm or less, and a thickness D [mm] of the film provided on the main surfaces and the thickness T [mm] of the substrate for a magnetic disk including the film satisfy a relationship $D \geq 0.0082/T - 0.0015$.

20 Claims, 2 Drawing Sheets

( Thickness $D = D_1 + D_2$ )

(56) References Cited

U.S. PATENT DOCUMENTS

| | | | | |
|---|---|---|---|---|
| 5,747,135 A * | 5/1998 | Chakrabarti | | G11B 5/7325 |
| | | | | 428/846.2 |
| 5,759,681 A | 6/1998 | Hosoe et al. | | |
| 6,316,097 B1 * | 11/2001 | Liu | | G11B 5/7325 |
| | | | | 428/332 |
| 6,863,947 B2 * | 3/2005 | Kaneko | | C03C 17/007 |
| | | | | 428/409 |
| 7,573,674 B1 * | 8/2009 | Wittig | | G11B 5/7315 |
| | | | | 360/99.12 |
| 8,167,685 B2 * | 5/2012 | Sakaguchi | | B24B 21/004 |
| | | | | 451/37 |
| 2002/0142191 A1 * | 10/2002 | Sakai | | C03C 19/00 |
| | | | | 428/846.9 |
| 2003/0017296 A1 | 1/2003 | Kaneko | | |
| 2003/0170416 A1 * | 9/2003 | Saito | | G11B 5/855 |
| | | | | 428/848 |
| 2007/0048553 A1 * | 3/2007 | Nakano | | G11B 5/7315 |
| | | | | 428/846.2 |
| 2010/0237041 A1 | 9/2010 | Morita et al. | | |
| 2013/0086986 A1 * | 4/2013 | Lanham | | G01F 15/14 |
| | | | | 73/649 |
| 2015/0085628 A1 | 3/2015 | Niwa et al. | | |
| 2018/0226095 A1 * | 8/2018 | Murase | | G11B 25/043 |
| 2020/0035268 A1 * | 1/2020 | Osakabe | | G11B 5/73915 |

FOREIGN PATENT DOCUMENTS

| | | |
|---|---|---|
| CN | 105590638 A | 5/2016 |
| JP | H08-212518 A | 8/1996 |
| JP | 2003016633 A | 1/2003 |
| JP | 2006-302358 A | 11/2006 |
| JP | 2010-218657 A | 9/2010 |
| JP | 2012-126626 A | 7/2012 |
| JP | 5939350 B1 | 6/2016 |

OTHER PUBLICATIONS

Office Action translated into Japanese in the corresponding Chinese Patent Application No. 201880018389.9, dated Nov. 2, 2020.

* cited by examiner (Thickness $D = D_1 + D_2$)

SUBSTRATE FOR MAGNETIC DISKS, AND MAGNETIC DISK

CROSS-REFERENCE TO RELATED APPLICATIONS

This U.S. National stage application of International Patent Application No. PCT/JP2018/025104, filed on Jul. 2, 2018, which, in turn, claims priority under 35 U.S.C. § 119(a) to Japanese Patent Application No. 2017-129613, filed in Japan on Jun. 30, 2017, the entire contents of which are hereby incorporated herein by reference.

BACKGROUND

Field of the Invention

The present invention relates to a substrate for a magnetic disk, and a magnetic disk.

Background Information

Conventionally, glass substrates and aluminum alloy substrates have been used as substrates for a magnetic disk. Magnetic disks are formed by forming a magnetic film on main surfaces of these substrates. There is a demand for magnetic disks that do not have surface defects and in which reading and writing of information is not hindered, and reading and writing of a large amount of information is enabled.

For example, in a case where an aluminum alloy substrate is used as a non-magnetic substrate for a magnetic disk, a surface of the aluminum alloy substrate is plated with NiP. At this time, in order to keep defects from occurring on the plated surface, an Al alloy substrate for a magnetic recording medium provided with a metal coating through physical vapor deposition on surfaces of the substrate is known (JP 2006-302358A).

With the above-described Al alloy substrate for a magnetic recording medium, it is possible to reduce surface defects formed on the surface of this substrate plated with NiP. Accordingly, a magnetic disk in which reading and writing of information is not hindered, and reading and writing of a large amount of information is enabled can be provided.

However, in recent years, in the hard disk drive industry, miniaturization of magnetic particles in magnetic disks is approaching the limit, and the speed at which recording density was improved in the past shows signs of slowing down. On the other hand, in order to analyze big data, there is increasing demand for an increase in the storage capacity of hard disk drive apparatuses (may also be referred to as HDDs hereinafter). Thus, attempts have been made to increase the number of magnetic disks provided in one hard disk drive apparatus.

If an increase in the storage capacity is to be realized by increasing the number of magnetic disks incorporated in a hard disk drive apparatus, there is a need to reduce the thickness of a magnetic-disk substrate occupying the majority of the thickness of the magnetic disk in a limited space in the magnetic disk drive apparatus.

Here, it has been found that, if the thickness of the magnetic-disk substrate is reduced, the rigidity of the substrate decreases, large vibration is likely to occur, and vibration is unlikely to settle in some cases. For example, an incredibly large number of hard disk drive apparatuses are used in a data center for a cloud, and thus hard disk drive apparatuses are often replaced due to failures. It was found that a new hard disk drive apparatus failed by an impact occurring when the new hard disk drive apparatus is mounted on a rack, or the period of time until it fails is shortened. Also, more thorough studies found that, when a hard disk drive apparatus takes on an external impact, the hard disk drive apparatus is damaged even though the magnetic disk is not rotating due to no power being supplied to the hard disk drive apparatus.

Unlike steady-state flutter vibration caused by the rotating magnetic disk and the air flow around the magnetic disk in a steady rotational state, vibration caused by an external impact in this manner attenuates over time. However, if this vibration has a large amplitude, particles are formed due to the magnetic head coming into contact with a ramp member provided to extend over a main surface of the magnetic disk so as to retract from the magnetic disk, and the ramp member being chipped, for example, and scratches and defects occur on surfaces of the magnetic disk in some cases. In particular, if large vibration does not attenuate and the number of instances of contact with an external member is increased, contact therewith occurs repeatedly at the same position on the magnetic disk in a situation in which the magnetic disk is not rotating, and thus particles, scratches, and defects are more likely to occur on the surface of the magnetic disk. In present circumstances, a nominal 3.5-inch size substrate for a magnetic disk has a large thickness of 0.8 mm or more, and thus an amplitude of vibration caused by an external impact that is problematic is unlikely to occur. Also, because the number of magnetic disks provided in a hard disk drive apparatus is as small as six or less, the distance (gap) between a magnetic disk and the ramp is relatively large. Thus, the magnetic disk and the ramp are unlikely to come into contact with each other. However, in the future, if the thickness of a magnetic-disk substrate is reduced in order to increase the storage capacity of a hard disk drive apparatus, for example, vibration caused by an external impact that has conventionally not been an issue, contact with another member such as a ramp member accompanying vibration, and particles, scratches, recesses, and the like that are formed accompanying contact with the ramp cannot be ignored.

SUMMARY

In view of this, an object of the present invention is to provide a substrate for a magnetic disk, and a magnetic disk by which the number of times the magnetic disk comes into contact with an external member due to vibration of the magnetic disk that is caused by an external impact and is different from flutter vibration can be effectively reduced even if the thickness of the substrate is reduced.

One aspect of the present invention is a substrate for a magnetic disk. The substrate includes:

a substrate main body having two main surfaces; and a film that is provided on the main surfaces and is made of a metal material having a loss factor of 0.01 or more.

The substrate for a magnetic disk including the film has a thickness T of 0.700 mm or less, and a thickness D [mm] of the film provided on the main surfaces and the thickness T [mm] of the substrate including the film satisfy Equation (1) below, $$D \geq 0.0082/T - 0.0015 \qquad (1).$$

It is preferable that the thickness D [mm] of the film and the thickness T [mm] of the substrate including the film satisfy Equation (2) below, $$D \geq 0.0094/T \qquad (2).$$

It is preferable that the substrate for a magnetic disk has a disk shape, and the disk shape has an outer diameter of 90 mm or more.

Another aspect of the present invention is also a substrate for a magnetic disk. The substrate includes:

a substrate main body having two main surfaces; and a film provided on the main surfaces.

The substrate for a magnetic disk has a disk shape having an outer diameter of 90 mm or more, the substrate for a magnetic disk including the film has a thickness T of 0.700 mm or less, and the film is provided such that, when an impact is applied under conditions of 120 [G] and 2 [msec] in a normal direction of the main surfaces in a state in which an inner circumferential portion of the substrate is fixed, the number of times an amount of shift caused by vibration of an outer circumferential edge portion of the substrate in a thickness direction of the substrate (the normal direction of the main surfaces of the substrate) is 0.2 mm or more is four or less.

Here, with regard to the substrate main body (a substrate for a magnetic disk having a configuration in which no film is provided), when the impact is applied to the substrate for a magnetic disk, the number of times an amount of shift caused by vibration of the outer circumferential edge portion of the substrate in the thickness direction is 0.2 mm or more may exceed four.

It is preferable that the film is provided to cover all surfaces of the substrate, a film thickness of the film provided on an edge surface of the substrate is larger than a film thickness of the film provided on the main surfaces, and the film is provided such that the film thickness on the edge surface is 110% or more of the film thickness on the main surfaces.

It is preferable that the substrate has a thickness T of 0.640 mm or less.

It is preferable that the substrate has a thickness T of 0.520 mm or less.

It is preferable that the film has a Vickers hardness Hv of 100 [kgf/mm$^2$] or more.

It is preferable that the material of the film includes an Ni—P alloy.

It is preferable that the film is formed on the main surfaces and an outer circumferential edge surface of the substrate main body, and the outer circumferential edge surface of the substrate main body forming an interface with the film has a surface roughness maximum height Rz of 0.5 μm or more.

It is preferable that the film is formed on the main surfaces and an outer circumferential edge surface of the substrate main body, and a surface roughness maximum height Rz of the film formed on the outer circumferential edge surface of the substrate for a magnetic disk is smaller than a surface roughness maximum height Rz of the substrate main body at the outer circumferential edge surface of the substrate main body.

Another aspect of the present invention is a magnetic disk, in which a surface of the substrate for a magnetic disk has at least a magnetic film.

According to the above-described substrate for a magnetic disk, and magnetic disk, it is possible to effectively reduce the number of times the magnetic disk comes into contact with an external member due to vibration of the magnetic disk that is caused by an external impact and is different from flutter vibration, even if the thickness of the substrate is reduced.

DESCRIPTION OF EMBODIMENTS

Hereinafter, a substrate for a magnetic disk of the present invention will be described in detail. Note that, although the following description will be given below using a magnetic-disk glass substrate, a substrate main body of the substrate for a magnetic disk may be a non-magnetic metal substrate, in addition to a glass substrate. That is, the substrate main body is a non-magnetic substrate made of glass or metal.

Aluminosilicate glass, soda-lime glass, borosilicate glass, and the like can be used as a material of the glass substrate. In particular, amorphous aluminosilicate glass can be suitably used in that chemical strengthening can be performed as needed, and a magnetic-disk glass substrate that has excellent flatness of main surfaces and substrate strength can be produced.

For example, an aluminum alloy, a titanium alloy, Si single crystal, and the like can be used as a material of a substrate made of metal. If an aluminum alloy is used, the aluminum alloy may contain magnesium as a component. Because a substrate made of a metal such as an aluminum alloy normally has a lower Young's modulus than a glass substrate, vibration is likely to be large due to the influence of an external impact. Thus, it is preferable to use a substrate made of metal because a particularly large improvement effect can be obtained by applying this invention to a substrate made of metal.

Figure 1:
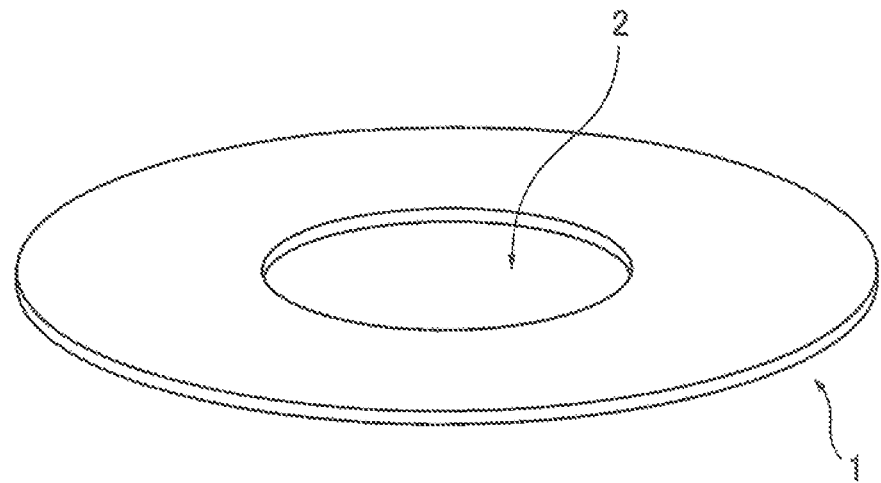
FIG. 1 is a diagram showing one example of an external shape of a substrate for a magnetic disk according to this embodiment.

FIG. 1 is a diagram showing an external shape of a substrate for a magnetic disk according to this embodiment. As shown in FIG. 1, a substrate 1 for a magnetic disk according to this embodiment (simply referred to as a "substrate 1" hereinafter) is a disk-shaped thin substrate provided with an inner hole 2. Although there is no limitation on the size of the substrate 1, the substrate 1 can be suitably applied to a magnetic-disk substrate having a nominal diameter of 2.5 inches, or 3.5 inches, for example. In the case of a magnetic-disk substrate having a nominal diameter of 3.5 inches, the disk shape preferably has an outer diameter (diameter) of 90 mm or more. Specifically, the nominal value of the outer diameter of the disk shape can be set to 95 mm or 97 mm. Even if a magnetic-disk substrate has such a large disk shape, the occurrence of particles, scratches, and recesses caused by vibration of a magnetic disk can be reduced by forming a film, which will be described later, on the main surfaces. Also, the upper limit of the outer diameter (diameter) of the disk shape is 100 mm, for example. Because the width of a general 3.5-inch HDD (the size at which it can be mounted in a 3.5-inch bay of a general PC case) is 101.6 mm, if the width thereof exceeds 100 mm, there is a risk that a wall will not have a sufficient thickness. Note that vibration of a magnetic disk caused by an external impact that is different from flutter vibration increases as the outer diameter of the substrate 1 increases, and is less likely to attenuate. Accordingly, it is preferable that the substrate 1 has a larger outer diameter because effects of this embodiment, which will be described later, can be exhibited more the larger the outer diameter is. That is, a substrate for a magnetic disk according to this embodiment is preferable for a substrate for a magnetic disk made to a 3.5-inch nominal diameter size or better.

Figure 2:
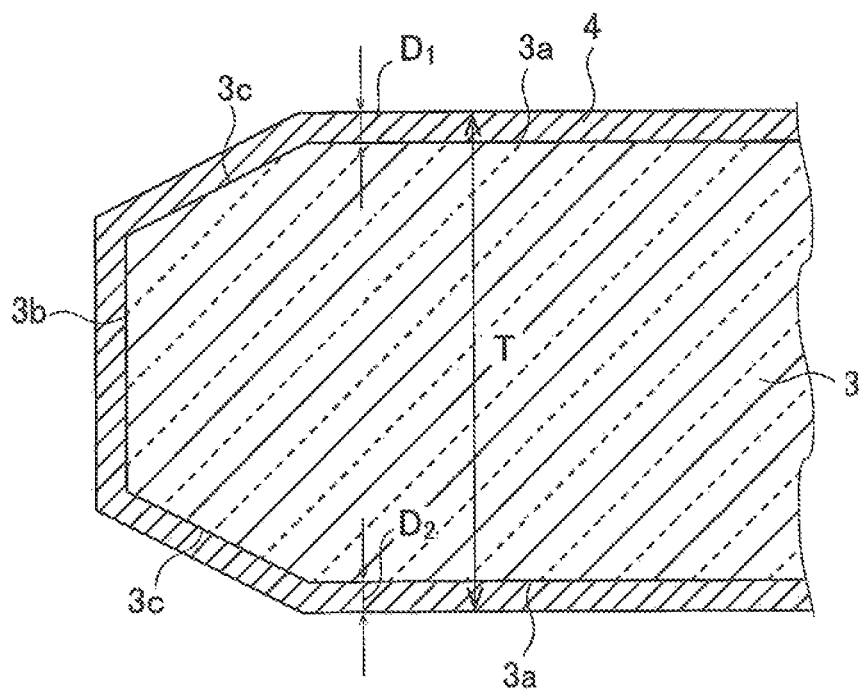
FIG. 2 is a diagram illustrating one example of an edge portion of the substrate for a magnetic disk and a film according to this embodiment.

FIG. 2 is a diagram illustrating one example of an edge portion of the substrate 1 and a film. As shown in FIG. 2, the substrate 1 includes a substrate main body 3 and a film 4.

The substrate main body 3 includes a pair of main surfaces 3a, a side wall surface 3b disposed in a direction orthogonal to the pair of main surfaces 3a, and a pair of chamfered surfaces 3c disposed between the pair of main surfaces 3a and the side wall surface 3b. The side wall surface 3b and the chamfered surfaces 3c are formed at an edge portion of the substrate 1 on the outer circumferential side and an edge portion thereof on the inner circumferential side.

If glass is used in the substrate main body 3, for example, the glass composition of the substrate main body 3 may include $SiO_2$ in an amount of 55 to 78 mol %, $Li_2O$ in an amount of 0.1 to 1 mol %, $Na_2O$ in an amount of 2 to 15 mol %, and MgO, CaO, SrO, and BaO in a total amount of 10 to 25 mol %, and a molar ratio (CaO/(MgO+CaO+SrI+BaO)) of the content of CaO to the total content of MgO, CaO, SrO, and BaO may be 0.20 or less. This glass is referred to as "glass 1".

Also, glass of the substrate main body 3 may be amorphous oxide glass containing $SiO_2$ in an amount of 45 to 68 mol %, $Al_2O_3$ in an amount of 5 to 20 mol %, $SiO_2$ and $Al_2O_3$ in a total amount ($SiO_2+Al_2O_3$) of 60 to 80 mol %, $B_2O_3$ in an amount of 0 to 5 mol %, MgO in an amount of 3 to 28 mol %, CaO in an amount of 0 to 18 mol %, BaO and SrO in a total amount (BaO+SrO) of 0 to 2 mol %, alkaline earth metal oxides in a total amount (MgO+CaO+SrO+BaO) of 12 to 30 mol %, alkali metal oxides in a total amount ($Li_2O+Na_2O+K_2O$) of 3.5 to 15 mol %, and at least one selected from the group consisting of Sn oxides and Ce oxides in a total amount of 0.05 to 2.00 mol %. This glass is referred to as "glass 2".

As shown in FIG. 2, all of the surfaces, that is, the main surfaces 3a, the side wall surface 3b, and the chamfered surfaces 3c, of the substrate main body 3 are provided with a film 4. The film 4 improves vibration isolation properties of the substrate 1.

The film 4 is a film made of a material having a loss factor of 0.01 or more. The film is constituted by a metal material.

The metal material of the film 4 is a material whose loss factor is higher than that of the material of the substrate main body 3. The value of a loss factor is a value at room temperature, for example, at 25° C. Hereinafter, a loss factor is the value at room temperature.

Here, the loss factor of the film 4 can be obtained through a vibration test in which the substrate main body 3 and the substrate 1 obtained by forming the film 4 on the substrate main body 3 are used as test samples, and the resonance frequencies and half widths at the resonance frequencies of the test samples are obtained. In the vibration test, "Young's modulus, shear modulus, and internal friction measuring device using free resonance method (JE series)" manufactured by Nihon Techno-Plus Co., Ltd. can be used, for example. The loss factors of the test samples are obtained from resonance frequencies and half widths of the test samples obtained in the vibration test. Also, the loss factor of the film 4 can be calculated according to a known equation indicated below, for example, from the resonance frequency and the loss factor of the substrate 1, the resonance frequency of the substrate main body 3, a ratio between the thickness of the substrate main body 3 and the thickness of the film 4, and a ratio between the density of the material of the substrate main body 3 and the density of the metal material of the film 4.

When the resonance frequency and the loss factor of the substrate 1 are respectively $f_1$ and $\eta_1$, the resonance frequency of the substrate main body 3 is $f_3$, a ratio of the total thickness of the film 4 to the thickness of the substrate main body 3 is a, and a ratio of the density of the metal material of the film 4 to the density of the material of the substrate main body 3 is b, the loss factor $\eta_4$ of the film 4 can be expressed as $\eta_4=\alpha/(\alpha-1)\cdot\eta_1$ where $\alpha=(f_1/f_3)^2\cdot(1+a\cdot b)$.

An Ni—P alloy containing Ni and P can be suitably used as a material having such a property (loss factor) of the film 4. If an Ni—P alloy is used, it is sufficient to add P to an alloy to make the alloy non-magnetic. For example, the content of P can be set to be 5 to 15 mass %. Also, an Mg alloy, an Al—Zn alloy, an Mg—Zr alloy, and the like can be used as the metal material of the film 4. Note that a sputtering method, an electroless plating method, an electrolytic plating method, or the like can be used as a film formation method. A film formation method need only be selected from these methods as appropriate.

A thickness T of the substrate 1 including the substrate main body 3 and the film 4 is 0.700 mm or less.

Also, a thickness D [mm] of the film 4 provided on the main surfaces 3a and the thickness T [mm] of the substrate 1 including the film 4 satisfy Equation (1) below. Note that it is preferable that the thickness of the film 4 does not change depending on a position on a main surface, and is constant on the main surfaces.

$$D \geq 0.0082/T - 0.0015 \quad (1)$$

Although the substrate 1 is likely to vibrate due to an external impact or the like because such a substrate 1 has a thickness of 0.700 mm or less, even if the above-described vibration occurs, because the film 4 is formed on the main surfaces 3a of the substrate main body 3, the vibration can be attenuated early. Also, it is preferable that the film 4 seamlessly covers the entire metal main body 1 including edge surfaces thereof because the degree of suppression of the vibration is particularly increased. Also, in this case, it is more preferable that the film 4 is harder than the substrate main body 3. Also, it is even more preferable that thicknesses D1 and D2 of the films 4 formed on the main surfaces 3a of the substrate main body 3 on both sides are equal to each other. In such a case, a vibration mode in which local large deformation occurs is less likely to occur, and the degree of suppression of vibration is higher. Thus, it is possible to reduce the number of instances of contact with a ramp member or a disk located at an adjacent position, for example.

Note that, although the films 4 are respectively formed on the main surfaces 3a on both sides in this embodiment, this embodiment also includes a configuration in which the film 4 is formed only on one of the main surfaces 3a. In this case, the thickness D of the film 4 is the thickness of the film 4 formed on the one main surface 3a.

Figure 3:
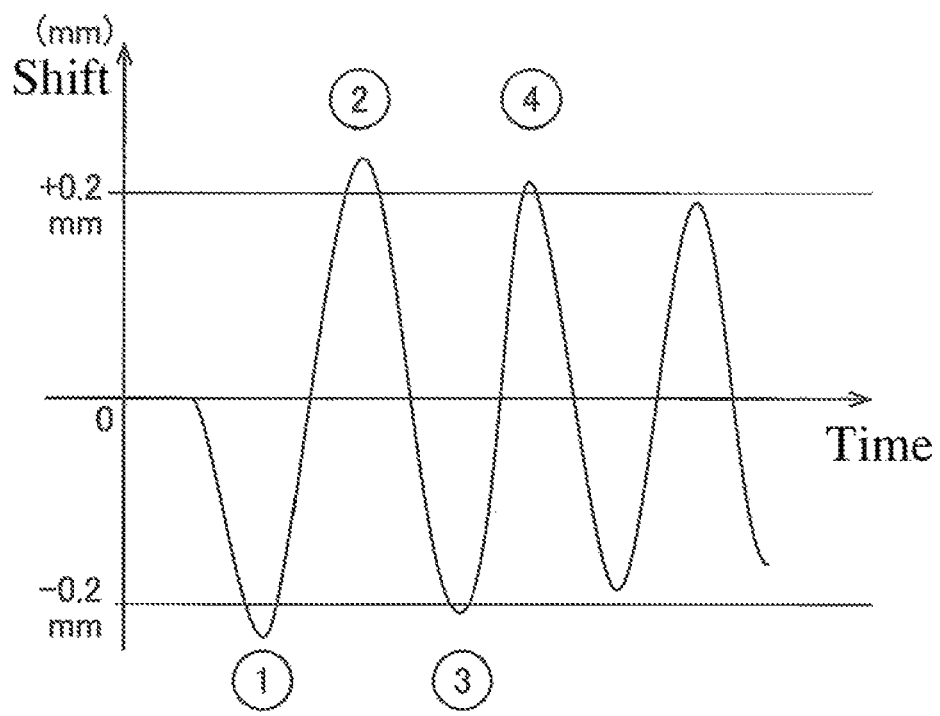
FIG. 3 is a diagram showing one example of vibration of the substrate for a magnetic disk according to this embodiment.

A magnetic disk produced by forming a magnetic film on the substrate 1 is fixed to a spindle of a hard disk drive apparatus in the vicinity of the inner hole 2 in a main surface, in the hard disk drive apparatus. For example, when a new hard disk drive apparatus is mounted on a rack for replacement, a hard disk drive apparatus on a rack is detached therefrom in order to move the hard disk drive apparatus to another position, for example, the hard disk drive apparatus may be subjected to an external impact accompanying these operations. Due to such an impact, vibration by which the main surfaces 3a of the substrate 1 shift in the normal direction (the thickness direction of the substrate 1) of the main surfaces 3a occurs. This shift is largest at the outer circumferential edge surface of the main surfaces. Also, unlike steady-state flutter vibration caused by the rotating magnetic disk and the air flow around the magnetic disk in a steady rotational state, as shown in FIG. 3, this vibration is vibration that attenuates over time. FIG. 3 is a diagram illustrating one example of vibration in the outer circumferential edge portion of the substrate 1 in the normal direction of the main surfaces.

Such vibration occurs even when the magnetic disk is rotating or is stationary. Thus, it is not preferable that this vibration continues for a long time, the magnetic disk formed of the substrate 1 comes into contact with the ramp member in the hard disk drive apparatus, and particles, scratches, and defects occur on a surface of the magnetic disk, and there is also a risk that particles are formed as a result of the ramp member being chipped due to this contact therewith. Specifically, if a stationary magnetic disk vibrates and comes into contact with the ramp member, the same portion of the magnetic disk will come into contact with the ramp member many times, and thus particles, scratches, and recesses are likely to occur more often.

However, with the substrate 1, the film 4 is constituted by a metal material having a loss factor of 0.01 or more, and the thickness D (=D1+D2) [mm] of the film 4 and the thickness T of the substrate main body 3 have a relationship D≥0.0082/T−0.0015. Although the smaller the thickness T is made, the more the amplitude of vibration increases, and the less likely the amplitude is to attenuate, the thickness D can be secured by defining the lower limit of the thickness D, and thus it is possible to attenuate vibration of the substrate 1 early. It is preferable that the film 4 has a loss factor of 0.02 or more. On the other hand, although there is no particular limitation on the upper limit of the loss factor of the film 4, a material having an excessively large loss factor may be a soft metal material whose crystals are likely to break. If the hardness of the film 4 is too low, there is a risk of the surface thereof being likely to be damaged after a magnetic disk is produced therefrom, which may cause an HDD to crash. Thus, from the viewpoint that a practical metal material can be used, a material having a loss factor of 0.3 or less is preferable.

If the thickness D is less than 0.0082/T−0.0015, the thickness D of the film 4 is not sufficiently thick relative to the thickness T of the substrate main body 3, and thus it is difficult to attenuate vibration in the substrate 1 early, and the film 4 cannot reduce the initial amplitude of vibration of the main surfaces 3a. As a result of setting the thickness D to be 0.0082/T−0.0015 or more, the film 4 covering the main surfaces 3a has a sufficient thickness, and thus it is possible to attenuate vibration in the substrate 1 early and suppress the initial amplitude of vibration. Accordingly, it is possible to effectively reduce the number of times the magnetic disk comes into contact with an external member such as the ramp member due to vibration of the magnetic disk, even if the thickness of the substrate is reduced. Also, it is preferable that the thickness D is 0.0094/T or more. It is preferable to set the thickness D to be 0.0094/T or more because the effect of reducing the number of times the magnetic disk comes into contact with an external member is further enhanced and the probability of a problem occurring after an HDD is activated is reduced.

Note that, although a magnetic film and the like are formed on the substrate 1 in a media process, the magnetic film and the like formed on any one surface have a total film thickness of 0.1 μm or less, and thus influences thereof on vibration to be addressed in this specification can be ignored. That is, vibration properties of a magnetic disk produced therefrom are the same as those of the substrate 1.

Figure 4:
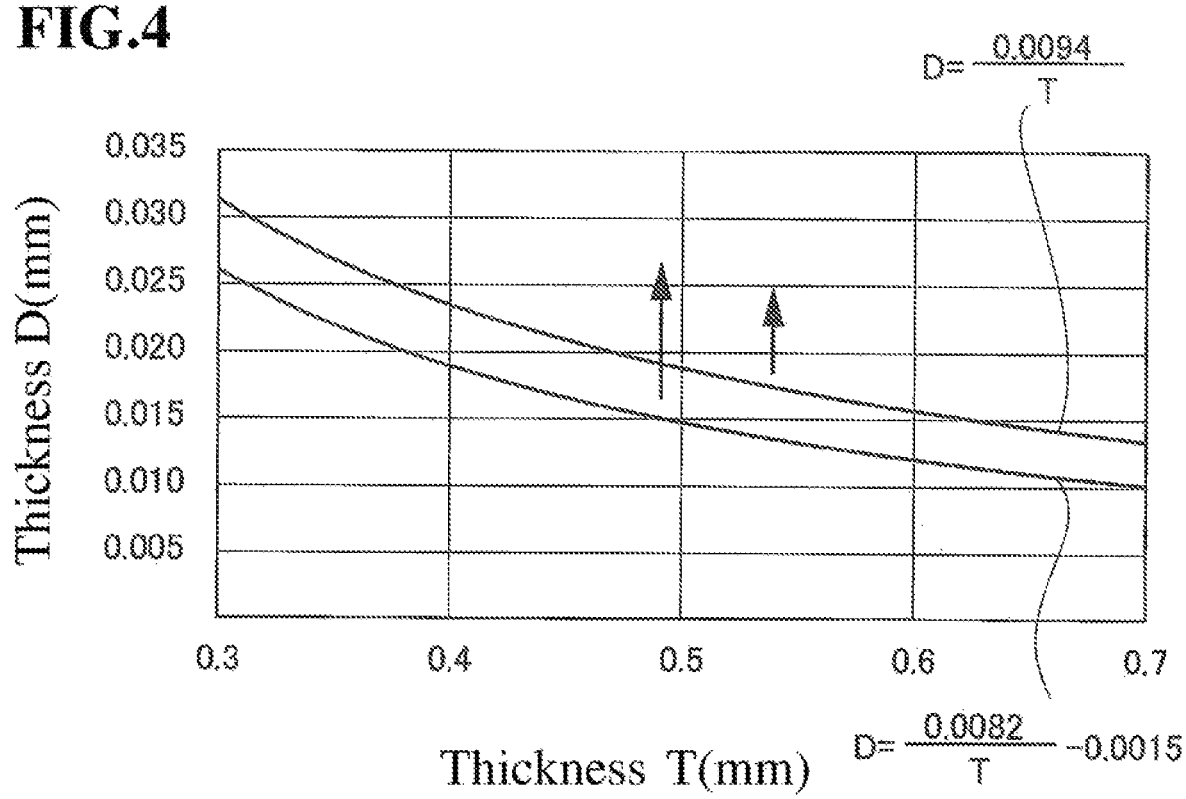
FIG. 4 is a diagram illustrating ranges of a thickness T [mm] and a thickness D [mm] of the substrate for a magnetic disk according to this embodiment.

FIG. 4 is a diagram illustrating ranges of the thickness T [mm] and the thickness D [mm] of the substrate 1 according to this embodiment. The ranges in this embodiment refer to regions above the solid-line curves shown in FIG. 4, the regions being indicated by arrows. In this manner, the smaller the thickness T is, the larger the lower limit of the thickness D is.

Although the film 4 can exhibit the above-described effects even if the film 4 is provided only on the main surfaces 3a and is not provided on the side wall surface 3b and the chamfered surfaces 3c, as shown in FIG. 2, it is preferable that the film 4 is provided to cover all of the surfaces of the substrate 1, that is, the film 4 is also provided continuously on the edge surfaces of the substrate main body 3, that is, the side wall surface 3b and the chamfered surfaces 3c, in addition to the main surfaces 3a. Vibration occurring in the substrate 1 is vibration that shifts in the normal direction of the main surfaces 3a, and shifts in the normal direction of the main surfaces 3a at the edge surfaces of the substrate main body 3 together with shifting of this vibration in the normal direction of the main surfaces 3a. As a result of also providing the film 4 on the edge surfaces of the substrate main body 3, that is, the side wall surface 3b and the chamfered surfaces 3c, in addition to the main surfaces 3a, it is possible to suppress the amount of shift in the normal direction of the main surfaces 3a, that is, the amplitude of vibration. It is inferred that this is because the vibration suppression effect of the film 4 is enhanced due to two main surfaces being connected by the film 4.

Also, the thickness of the film 4 provided on the side wall surface 3b and the chamfered surfaces 3c is preferably larger than the thicknesses D1 and D2 of the films 4 respectively provided on the main surfaces 3a. It is inferred that doing so increases connectivity and connectedness of the two main surfaces, and the vibration suppression effect of the film 4 is enhanced. Vibration occurring in the substrate 1 is vibration that shifts in the normal direction of the main surfaces 3a, and shifts in the normal direction of the main surfaces 3a at the edge surfaces of the substrate main body 3 together with shifting of this vibration in the normal direction of the main surfaces 3a. As a result of suppressing such shifting, it is possible to suppress the amount of shift in the normal direction of the main surfaces 3a, that is, the amplitude of vibration, and thus it is preferable that the film 4 is also formed on the edge surfaces of the substrate main body 3, that is, the side wall surface 3b and the chamfered surfaces 3c, in addition to the main surfaces 3a.

It is preferable that the film 4 is provided such that the film thickness on an edge surface (the side wall surface 3b and the chamfered surfaces 3c) of the substrate main body 3 is 110% or more of the film thicknesses D1 and D2 (the larger film thickness of the two if the film thicknesses D1 and D2 are different from each other) on the main surfaces 3a. This makes it possible to suppress the amplitude of vibration without affecting the thickness T of the substrate 1. Also, the film thickness on the edge surface of the substrate main body 3 is preferably 150% or less of the film thicknesses D1 and D2 on the main surfaces 3a. It is not preferable that the film thickness on the edge surface of the substrate main body 3 exceeds 150% of the film thicknesses D1 and D2 on the main surfaces 3a because centrifugal force occurring as a result of the substrate 1 rotating as a magnetic disk increases due to an increase in the mass of an outer circumferential edge portion of the substrate 1, and flutter vibration is likely to increase due to this centrifugal force.

Because the amplitude of vibration increases as the thickness of the magnetic disk is reduced, the number of instances of contact between the magnetic disk and another member in the hard disk drive apparatus increases, and problems arise in that particles formed along with contact therebetween and the number of defects such as scratches and recesses of the magnetic disk increase, but the above-described problems are unlikely to arise even if the substrate 1 has a thickness of 0.640 mm or less. The substrate 1 may have a thickness of 0.570 mm or less, 0.52 mm or less, or 0.400 mm or less. Also, the substrate 1 may have a thickness of 0.635 mm or less, 0.550 mm or less, 0.500 mm or less, or 0.381 mm or less, for example. From the viewpoint of mechanical durability, the lower limit of the thickness of the substrate 1 is preferably 0.2 mm or more. Although, as the thickness of the substrate 1 is reduced, formation of particles and occurrence of defects such as scratches and recesses in some cases becomes more of an issue in principle, this embodiment exhibits significant effects of reducing particles and defects such as scratches and recesses.

It is preferable to set the thickness T of the substrate 1 to 0.640 mm or less because it is possible to increase, from eight to nine, the number of substrates mounted in a general 3.5-inch HDD that has a height of 26.1 mm (the size at which it can be mounted in a 3.5-inch bay of a general PC case) and is provided with a gap between ramp members, which will be described later, which the magnetic disk enters, the gap having a length of "the thickness of the magnetic disk+0.4 mm. Note that, if the height of an HDD is set to 26.1 mm or more, the number of mounted substrates can be increased to nine or more. Also, it is more preferable to set the thickness of the substrate to 0.520 mm or less because the number of substrates mounted in an HDD having the same size as that of the above-described HDD can be increased to ten or more.

Although there have been problems in that a disk often comes into contact with a disk located adjacent to a ramp member when subjected to an external impact because these HDDs are provided with a larger number of substrates than in a conventional HDD, and damage (particles, scratches, and recesses) caused by these instances of contact are likely to occur, damage can be suppressed as a result of using a substrate according to this embodiment.

According to one embodiment, the film 4 preferably has a Vickers hardness Hv of 100 [kgf/mm$^2$] or more. As a result of increasing the Vickers hardness Hv, defects such as scratches and recesses are less likely to occur when the magnetic disk comes into contact with a ramp member or the like in the hard disk drive apparatus. If the Vickers hardness Hv is less than 100 [kgf/mm$^2$], when the magnetic disk comes into contact with a ramp member or the like in the hard disk drive apparatus, defects such as scratches and recesses occur, and the hard disk drive apparatus is likely to fail.

According to one embodiment, it is preferable that the outer circumferential edge surface of the disk-shaped substrate main body 3 that forms an interface with the film 4 has a surface roughness maximum height Rz (JIS B 0601: 2001) of 0.5 μm or more. In this specification, roughness of the substrate main body 3 at the interface with the film 4 is referred to as surface roughness of the outer circumferential edge surface of the substrate main body 3 forming the interface with the film 4. The substrate main body 3 is provided with the film 4 on the outer circumferential edge surface thereof as well, but an image of the cross-section of the outer circumferential edge surface of the substrate main body 3 can be acquired using the method indicated below, and the maximum height Rz can be obtained. Specifically, first, a sample with the cross-section of the outer circumferential edge surface exposed is produced by, using an ion polishing method, cutting the outer circumferential edge surface of the substrate 1 provided with the film 4 along a plane that passes through the center of the substrate 1 and is perpendicular to the main surfaces. With regard to this cross-section, an image of the cross-section of the outer circumferential edge surface is obtained using a scanning electron microscope (SEM) at a magnification of 5000, for example. A curve of protrusions and recesses of a surface of the substrate main body 3 that forms the interface where the substrate main body 3 is in contact with the film 4 is acquired from this image through binarization or visual tracing on the image of the cross-section, for example, and a region having a width of 20 μm located at any portion on this curve of protrusions and recesses is extracted to obtain the maximum height Rz.

Vibration is further suppressed by the film 4 due to the interface of the substrate main body 3 that is in contact with the film 4 having surface unevenness to some extent. It is inferred that vibration is suppressed because protruding portions of the substrate main body 3 and the film 4 enter and engage recessed portions of each other at the interface between the substrate main body 3 and the film 4, thus increasing adherence therebetween, and the vibration suppression effect of the film 4 affects the substrate main body 3. Although film stress, which is a factor for causing film separation, increases as a result of making the film 4 thicker, by setting the above-described maximum height Rz to be 0.5 μm or more, it is also possible to prevent film separation caused by film stress. The outer circumferential edge surface has a smaller area than the main surface and has a complicated shape, and the substrate 1 has a thickness of 0.700 mm or less, which is smaller than that of a conventional substrate, and thus film separation is likely to occur on the outer circumferential edge surface of the substrate 1. However, as a result of setting Rz of the surface (interface) of the substrate main body to 0.5 μm or more, it is possible to increase adherence between the substrate main body 3 and the film 4, prevent separation of the film 4, and enhance long-term reliability of an HDD.

Note that, in order to further suppress the above-described vibration, the surface roughness maximum height Rz of the outer circumferential edge surface of the substrate main body 3 is more preferably 1.0 μm or more, and even more preferably 1.5 μm or more. On the other hand, if the maximum height Rz is excessively large, surface roughness of the film 4 after the film 4 is formed (surface roughness on the outer circumferential edge surface of the substrate 1) increases according to surface roughness of the substrate main body 3, foreign matter is likely to attach to the outer circumferential edge surface during processing such as main surface polishing, and foreign matter is also likely to attach to the outer circumferential edge surface of the magnetic disk after a magnetic film is formed, and thus there is a risk that the yields of the substrates 1 and the hard disk drive apparatuses at the time of manufacture will decrease. Note that a portion of the outer circumferential edge surface whose maximum height Rz is set to 0.5 µm or more need only be at least a portion of the outer circumferential edge surface, and in order to enhance suppression of the above-described vibration and film separation prevention effect, both the side wall surface 3b and the chamfered surfaces 3c preferably have a maximum height Rz of 0.5 µm or more.

On the other hand, if the maximum height Rz of the main surface of the substrate main body 3 is too large, there is a risk that defects will form at an early stage of the formation of the film 4 and propagate, and defects such as a recessed portion and a crack will occur on a surface of the film 4. Although these defects may cause corrosion and defects in a polished surface and thus are preferably removed, it is difficult to remove these defects because defects run deep, and thus have lasting effects after a magnetic film is formed to produce a magnetic disk. Thus, it is preferable that the main surface of the substrate main body 3 has a maximum height Rz of 1 µm or less, for example.

Also, according to one embodiment, the surface roughness maximum height Rz of the film 4 provided on the outer circumferential edge surface of the substrate 1 is preferably smaller than the surface roughness maximum height Rz of the substrate main body 3 at the outer circumferential edge surface of the substrate main body 3 (at a boundary surface that is in contact with the film 4).

With regard to the surface roughness maximum height Rz of the film 4 on the outer circumferential edge surface of the substrate 1, for example, the maximum height Rz is obtained at a plurality of positions (e.g., three positions) on the outer circumferential edge surface using a stylus surface roughness/contour shape measurement device under the following conditions, and an average value thereof obtained at the plurality of positions is used as the surface roughness maximum height Rz of the film 4. Note that the direction in which the stylus moves (scans) is the thickness direction of the substrate 1.

Shape of stylus: the radius of the leading end is 2 µm, and a taper angle of the cone is 60 degrees
Stylus load: 0.75 mN
Stylus moving speed: 0.02 mm/sec
Sampling length: 0.08 mm
Filter $\lambda c$: 0.08 mm
Filter $\lambda s$: 0.0008 mm.

If the film 4 provided on the outer circumferential edge surface of the substrate 1 has an excessively large surface roughness maximum height Rz, as a result of the excessively large surface roughness maximum height Rz, foreign matter is likely to attach to the substrate 1 and scratches are likely to occur due to the outer circumferential edge surface being held, in downstream processes such as formation of a magnetic film, and thus the above-described maximum height Rz is preferably small. Thus, it is preferable to make the surface roughness maximum height Rz of the film 4 provided on the outer circumferential edge surface of the substrate 1 smaller than the surface roughness maximum height Rz of the substrate main body 3 at the outer circumferential edge surface of the substrate main body 3 (at a boundary surface that is in contact with the film 4). This makes it possible to increase adherence between the substrate main body 3 and the film 4, prevent separation of the film 4, increase long-term reliability of an HDD, and prevent attachment of foreign matter to the outer circumferential edge surface and occurrence of scratches due to the outer circumferential edge surface being held when a magnetic film is formed on the substrate 1. The maximum height Rz is more preferably 1.0 µm or less, and even more preferably 0.5 µm or less. Note that, although a position on the outer circumferential edge surface of the substrate 1 at which the maximum height Rz is limited need only be located in at least a portion of the outer circumferential edge surface of the substrate 1, in order to enhance the above-described vibration suppression effect and film separation prevention effect, this position is preferably located on the surface of the substrate 1 in a surface portion of the film 4 formed on the side wall surface 3b and the chamfered surfaces 3c. Note that the surface roughness of the film 4 on the outer circumferential edge surface is likely to follow surface roughness of the substrate main body 3, which is the underlayer. Thus, if a surface of the substrate main body 3 is too rough, additional processing such as edge surface polishing processing may be required after the film 4 is formed.

In another embodiment of such a substrate 1, the substrate 1 has a disk shape having an outer diameter of 90 mm or more, and the substrate 1 has a thickness of 0.700 mm or less. In this case, the film 4 is provided to have properties whereby the number of times, when an impact is applied under the conditions of 120 [G] and 2 [msec] in a state in which an inner circumferential portion of the substrate 1 is fixed, the amount of shift caused by vibration of the outer circumferential edge portion of the substrate 1 in the thickness direction (the normal direction of the main surfaces) is 0.2 mm or more is four or less. For example, the loss factor of the film 4 and the film thickness are set to realize the above-described properties.

It is preferable that the number of times the above-described amount of shift is 0.2 mm or more is four or less, because the number of instances of repeated contact with an external member at the same position is two or less. Also, it is more preferable that the number of times the above-described amount of shift is 0.2 mm or more is two or less. If the above-described number of times is two or less, it means that multiple instances of contact do not occur on one surface of the substrate 1. That is, it is more preferable that the number of times the above-described amount of shift is 0.2 mm or more is two or less, because no repeated collisions occur at the same position on a main surface.

Here, the properties of the substrate main body 3 may be such that, when the above-described impact is applied to the substrate main body 3, the number of times the amount of shift caused by vibration of the outer circumferential edge portion of this substrate main body in the thickness direction is 0.2 mm or more exceeds four. It is possible to reduce the number of times the amount of shift is 0.2 mm or more to four or less by providing the film 4 whose material or thickness is adjusted.

Usually, if the substrate 1 has a disk shape having an outer diameter of 90 mm or more and has a thickness of 0.700 mm or less, the amount of shift caused by vibration of the outer circumferential edge portion of the substrate 1 in the thickness direction is likely to be large, but with the substrate 1, the number of times the amount of shift caused by vibration is 0.2 mm or more is limited to be four or less due to the effects of the film 4.

Such a substrate 1 is produced as follows, for example. Here, a case where a glass substrate is used as the substrate 1 will be described as one example.

First, processing for molding a glass blank that serves as a raw material of a plate-shaped magnetic-disk glass substrate having a pair of main surfaces is performed. Next, the glass blank is roughly ground. Then, shape processing and edge surface polishing are performed on the glass blank.

Then, precision grinding is performed on a glass substrate obtained from the glass blank, using fixed abrasive particles. Then, first polishing, chemical strengthening, and second polishing are performed on the glass substrate. Then, film formation and film polishing are performed. Note that, although the glass substrate is produced in the above-described flow in this embodiment, it is not necessary to always perform the above-described processes and these processes may be omitted as appropriate. For example, in the above-described processes, edge surface polishing, precision grinding, first polishing, chemical strengthening, and second polishing need not be carried out. Hereinafter, each of the processes will be described.

(a) Molding of Glass Blank

A press molding method may be used to mold the glass blank, for example. A circular glass blank can be obtained using a press molding method. Also, a glass blank can be manufactured using a known manufacturing method such as a downdraw method, a redraw method, or a fusion method. A disk-shaped glass substrate, which is the base of a magnetic-disk glass substrate, can be obtained by appropriately performing shape processing on the plate-shaped glass blank produced using these known manufacturing methods.

(b) Rough Grinding

In rough grinding, main surfaces on both sides of the glass blank are ground. Loose abrasive particles are used as an abrasive material, for example. In rough grinding, grinding is performed such that the glass blank is brought approximately closer to a target substrate thickness and a target flatness of the main surfaces. Note that rough grinding is performed according to the dimensional accuracy or the surface roughness of the molded glass blank, and may be omitted in some cases.

(c) Shape Processing

Next, shape processing is performed. In the shape processing, after the glass blank is molded, a circular hole is formed using a known processing method to obtain a disk-shaped glass substrate having a circular hole. Then, chamfering of edge surfaces of the glass substrate is carried out. Accordingly, a side wall surface 3b orthogonal to the main surfaces and chamfered surfaces 3c that are inclined with respect to the main surfaces 3a and between the side wall surface 3b and the main surfaces 3a on both sides are formed on the edge surfaces of the glass substrate.

(d) Edge Surface Polishing

Next, edge surface polishing is performed on the glass substrate. Edge surface polishing is processing for performing polishing by supplying a polishing liquid containing loose abrasive particles between a polishing brush and the edge surfaces (the side wall surface 3b and the chamfered surfaces 3c) of the glass substrate and moving the polishing brush and the glass substrate relative to each other. In edge surface polishing, an inner circumferential side edge surface and an outer circumferential side edge surface of the glass substrate are polishing targets, and the inner circumferential side edge surface and the outer circumferential side edge surface are formed into mirror surfaces. Note that edge surface polishing need not be performed in some cases.

(e) Precision Grinding

Next, precision grinding is performed on the main surfaces of the glass substrate. For example, the main surfaces 3a of the glass substrate are ground using a double-side grinding apparatus provided with a planetary gear mechanism. In this case, grinding is performed with the surface plates provided with fixed abrasive particles, for example. Alternatively, grinding is also performed using loose abrasive particles. Note that precision grinding need not be performed in some cases.

(f) First Polishing

Next, first polishing is performed on the main surfaces 3a of the glass substrate. First polishing is performed using loose abrasive particles and polishing pads attached to the surface plates. First polishing removes cracks and warping remaining on the main surfaces 3a in the case where grinding is performed with fixed abrasive particles, for example. In first polishing, surface roughness of the main surfaces 3a, or for example, an arithmetic average roughness Ra, can be reduced while preventing the shape of the edge portions of the main surfaces 3a from being excessively recessed or protruding.

Although there is no particular limitation on the loose abrasive particles used in first polishing, cerium oxide abrasive particles, zirconia abrasive particles, or the like are used, for example. Note that first polishing need not be performed in some cases.

(g) Chemical Strengthening

The glass substrate can be chemically strengthened as appropriate. A melt obtained by heating potassium nitrate, sodium nitrate, or a mixture thereof, for example, is used as a chemical strengthening liquid. Also, by immersing the glass substrate in the chemical strengthening liquid, lithium ions and sodium ions in the glass composition that are present in a surface layer of the glass substrate are respectively substituted with sodium ions and potassium ions in the chemical strengthening liquid whose ion radii are relatively large, whereby compressive stress layers are formed on the surface layer portions and the glass substrate is strengthened.

Although the timing at which chemical strengthening is performed is determined as appropriate, the polishing is particularly preferably performed after chemical strengthening, because the surface can be smoothed and foreign matter attached to the surface of the glass substrate can be removed through chemical strengthening. Also, chemical strengthening need not be performed in some cases.

(h) Second Polishing (Mirror-Polishing)

Next, second polishing is performed on the chemically strengthened glass substrate. Second polishing is for performing mirror-polishing on the main surfaces 3a. In second polishing as well, polishing is performed using a polishing apparatus having a configuration similar to that in first polishing. In second polishing, the type and the particle size of loose abrasive particles are changed relative to first polishing and mirror polishing is performed using resin polishers having a low hardness as the polishing pads. Doing so makes it possible to reduce the roughness of the main surfaces 3a while preventing the shape of edge portions of the main surfaces 3a from being excessively recessed or protruding. The main surfaces 3a preferably have an arithmetic average Ra (JIS B 0601 2001) of 0.2 nm or less. Note that second polishing need not be performed in some cases because the main surfaces 3a of the substrate that have been subjected to second polishing are not the outermost surfaces of the substrate 1 having the film 4.

(i) Film Formation

The film 4 is formed on the main surfaces 3a, the side wall surface 3b, and the chamfered surfaces 3c of the produced glass substrate. The film 4 is formed using an electrolytic plating method, an electroless plating method, a sputtering method, or the like. Pre-treatment for improving the adherence of the film 4 or formation of a base layer may be performed as needed before the film 4 is formed. The film 4 is formed on the main surfaces 3a, the side wall surface 3b, and the chamfered surfaces 3c, and can have the same thickness on any of the surfaces. In order to reduce internal stress of the formed film 4, annealing (heat treatment) is performed on the film 4 as needed after the film 4 is formed. Note that the film 4 is preferably a non-magnetic film so as not to cause noise when a magnetic disk is finally produced.

(j) Film Polishing

After the film 4 is formed, in order to reduce surface roughness of the film 4, the film 4 provided on the main surfaces 3a of the substrate main body 3 are polished. Film polishing aims to realize mirror-polishing. In film polishing as well, polishing can be performed using a polishing apparatus having a configuration similar to that in first polishing. In film polishing, the type and the particle size of loose abrasive particles are changed relative to first polishing and polishing is performed using resin polishers having a low hardness as the polishing pads. In film polishing, polishing may be performed a plurality of times as needed. In this case, precise polishing is performed using loose abrasive particles with a smaller size in polishing in downstream processes. In this manner, the film 4 formed on the main surfaces 3a is polished, and the film 4 formed on the side wall surface 3b and the chamfered surfaces 3c are not polished, and thus the film 4 formed on the side wall surface 3b and the chamfered surfaces 3c can be made thicker than the film 4 on the main surfaces 3a.

As described above, because the film 4 formed on the side wall surface 3b and the chamfered surfaces 3c exhibits the effect of suppressing the amplitude of vibration of the main surfaces 3a of the substrate 1, it is preferable to set the thickness of the film 4 such that the thickness of the film 4 formed on the side wall surface 3b and the chamfered surfaces 3c has a thickness with which the amplitude of vibration of the main surfaces 3a can be suppressed.

After film polishing is performed, the glass substrate provided with the film 4 is cleaned to produce a substrate for a magnetic disk.

Note that, if the substrate main body 3 is an AL alloy substrate, the substrate main body 3 is produced using the following method, for example.

First, an Al alloy substrate, which is to be the substrate main body 3, is subjected to machining to have a shape with a predetermined size through cutting. In order to improve shape accuracy and flatness of the substrate main body 3, hot-press annealing is then performed. Also, the edge surfaces (inner and outer circumferential edge surfaces) of the substrate main body 3 are ground and polished. When edge surfaces are ground, the edge surfaces of the substrate main body 3 are ground by rotating the edge surfaces and a rotation tool, and supplying a grinding liquid from a nozzle while pressing the rotation tool to which abrasive particles are fixed against edge surfaces of the substrate main body 3 that has been cut in a manner similar to that for the glass substrate. The chamfered surfaces of the substrate main body 3 are formed through grinding using a formed grindstone obtained by shaping an end portion of the rotation tool to a chamfering shape in advance. Also, if surface roughness of an edge surface is to be reduced, a polisher made of nonwoven fabric is attached to the surface of the rotation tool, and the edge surfaces of the substrate main body 3 are polished while supplying a polishing liquid in which loose abrasive particles are dispersed.

Next, the main surfaces of the substrate main body 3 are ground using a double-side grinding apparatus, are polished a plurality of times using a double-side polishing apparatus, polyurethane-foam resin polishers, and a polishing liquid containing alumina abrasive particles or colloidal silica abrasive particles, and are lastly cleaned.

Note that zincate treatment may be performed on the substrate main body 3 as pre-treatment of formation of the film 4. After the film 4 is formed, annealing is performed as appropriate in order to reduce the internal stress of the film 4. After the film 4 is annealed, the main surfaces 3a are polished. Polishing is performed a plurality of times as needed for the substrate. Then, cleaning is performed to produce a substrate 1 for a magnetic disk.

In addition to the above-described Ni—P alloy, an Mg alloy, an Al—Zn alloy, an Mg—Zr alloy, and the like can be used for the film 4. Here, from the viewpoint of suppressing vibration of the substrate 1, the metal material of the film 4 has a higher loss factor than the substrate main body 3 and has a loss factor of 0.01 or more, and according to one embodiment, the metal material of the film 4 preferably has a loss factor of 0.02 or more, and more preferably has a loss factor of 0.03 or more. Also, the substrate main body 3 preferably has a loss factor of 0.002 or less, and more preferably has a loss factor of 0.001 or less. The smaller the loss factor of the substrate main body 3 is, the better the vibration suppression effect of the film 4 is, and thus the substrate main body 3 having a smaller loss factor is preferable. An amorphous aluminosilicate glass substrate to be used for a magnetic disk has a loss factor of 0.001 or less, for example. Also, an Al—Mg alloy substrate for a magnetic disk has a loss factor of 0.002 or less, for example. In this manner, the loss factor of the film 4 is sufficiently large with respect to the loss factor of the substrate main body 3, and thus, as a result of forming the film 4, a vibration suppression effect can be effectively obtained.

Also, according to one embodiment, from the viewpoint that particles, scratches, and recesses are less likely to occur, the material of the film 4 preferably has a Vickers hardness Hv of 100 [kgf/mm$^2$] or more, more preferably has a Vickers hardness Hv of 200 [kgf/mm$^2$] or more, and even more preferably has a Vickers hardness Hv of 400 [kgf/mm$^2$] or more.

Table 1 below shows properties of materials that can be suitably used as the material of the substrate main body 3 and the film 4. Loss factors shown in Table 1 below were calculated using the above-described loss factor calculation method. The value of a loss factor is the value at room temperature. A Vickers hardness Hv is measured using a micro-Vickers hardness tester, under conditions in which the indenter load was 10 gf for the film 4 because the film 4 was a thick film and the indenter load was 300 gf for the substrate main body 3.

TABLE 1

|  | Loss Factor | Vickers Hardness [kgf/mm$^2$] |
| --- | --- | --- |
| Aluminosilicate Glass | 0.0003~0.0008 | 600~760 |
| Al—Mg Alloy | 0.0005~0.0017 | 50~100 |
| Mg Alloy | 0.01 | 55 |
| Al—Zn Alloy | 0.05 | 100 |
| Mg—Zr Alloy | 0.09 | 100 |
| Ni—P Alloy | 0.03 | 500 |

In Table 1 above, the loss factor of aluminosilicate glass was obtained from glass having the composition of the above-described glass 1 or glass 2. Note that the glass 2 typically has a loss factor of 0.0006 and has a Vickers hardness of 741 [kgf/mm$^2$].

The composition of an Al—Mg alloy includes Mg in an amount of 3.5 to 5 mass %, Si in an amount of 0 to 0.05 mass %, Fe in an amount of 0 to 0.1 mass %, Cu in an amount of 0 to 0.12 mass %, Mn in an amount of 0 to 0.3 mass %, Cr in an amount of 0 to 0.1 mass %, Zn in an amount of 0 to 0.5 mass %, Ti in an amount of 0 to 0.1 mass %, and Al as the remaining portion, for example.

The composition of an Mg alloy includes Mg in an amount of 91.57 mass %, Al in an amount of 7.6 mass %, Zn in an amount of 0.7 mass %, and Mn in an amount of 0.13 mass %.

The composition of an Al—Zn alloy includes Al in an amount of 60 mass % and Zn in an amount of 40 mass %.

The composition of an Mg—Zr alloy include Mg in an amount of 99.4 mass % and Zn in an amount of 0.6 mass %.

The composition of an Ni—P alloy includes Ni in an amount of 90 mass % and P in an amount of 10 mass %.

As is understood from Table 1, from the viewpoint of vibration suppression, it is preferable to use aluminosilicate glass or an Al—Mg alloy as the material of the substrate main body 3, and use an Ni—P alloy, an Mg alloy, an Al—Zn alloy, and an Mg—Zr alloy as the material of the film 4. Also, an Ni—P alloy, an Al—Zn alloy, and an Mg—Zr alloy have a high Vickers hardness Hv of 100 [kgf/mm$^2$] or more, and are more suitable as the material of the film 4, and particles, scratches, and recesses are less likely to occur. Also, it is understood that an Ni—P alloy has a very high Vickers hardness Hv, and is even more suitable as the material of the film 4.

Experimental Example 1

In order to examine the effects of the substrate 1 for a magnetic disk, various substrates were produced (examples 1 to 21).

An aluminum alloy (Al—Mg alloy) was used as the material of the substrate main body of the substrate 1 for a magnetic disk. In a case where the film 4 was formed, the film 4 was formed through electroless plating such that an Ni—P alloy (P: 10 mass %, the remaining portion was Ni) covered all of the surfaces of the substrate main body 3 at an equal film thickness. Then, main surfaces on both sides were polished using a double-side polishing apparatus, and 10% of the thickness of the film 4 formed on each main surface was removed through polishing. The film 4 had the same final thickness on the main surfaces on both sides, and the thickness of the film 4 formed on each main surface was 90% of the thickness of the film 4 formed on an edge surface. In other words, the thickness of the film 4 formed on an edge surface was about 111% of the thickness of the film 4 formed on main surfaces. The loss factor of the Ni—P alloy satisfied 0.01 or more.

Also, the produced substrate 1 had an outer diameter of 95 mm and an inner diameter (the diameter of a circular hole) of 25 mm, and chamfered surfaces were formed at connection portions of an outer circumferential edge surface and an inner circumferential edge surface that are respectively connected to both main surfaces. With regard to the specification of this chamfered surface, if T was 0.64 mm or more, an angle to a main surface was 45 degrees, the length thereof in a radial direction was 150 μm, and the length thereof in the thickness direction was 150 μm. Also, if T was less than 0.64 mm, an angle to a main surface was 45 degrees, the length thereof in a radial direction was 100 μm, and the length thereof in the thickness direction was 100 μm. Roughness of the outer circumferential edge surface at this time was adjusted such that the surface of the substrate main body 3 and the surface of the substrate 1 had a maximum height Rz of 0.1 μm.

The produced substrate 1 was attached to an evaluation apparatus provided with a high-speed camera. This evaluation apparatus can apply an external impact of any magnitude, and capture moving images of motion (vibration) of an outer circumferential edge portion of a substrate that occurs accompanying the external impact. Then, the evaluation apparatus can measure shift of the outer circumferential edge portion in the normal direction of the main surfaces by analyzing the moving images.

Note that a ramp for a ramp load mechanism for a magnetic head is incorporated in an actual HDD, and when magnetic disks are mounted, there are 0.2 mm-gaps extending from both main surfaces. That is, a gap between ramps that a magnetic disk enters has a length that is the thickness of the magnetic disk+0.4 mm. The actual HDD is designed to have a fixed gap, even if the thickness of a substrate is changed. On the other hand, the evaluation apparatus was not provided with this ramp. Thus, whether or not a substrate comes into contact with a ramp in an actual HDD due to the amount of shift of the substrate caused by vibration is determined using the amount of shift of the substrate, and if the amount of shift is less than 0.2 mm, it can be determined that no instances of contact with the ramp occur. Note that, the thickness of a magnetic film and the like formed in a media process can be substantially ignored because the thickness of the magnetic film and the like was about 100 nm or less on any one surface, even if it included a base film, a soft magnetic layer, and the like. The substrate did not rotate in this evaluation, and evaluation was made in a stationary state.

An impact test in which an impact was applied under the conditions of 120 [G] and 2 [msec] in the normal direction of main surfaces of the substrate 1 was performed using this evaluation apparatus, and vibration of an outer circumferential edge portion in the normal direction of the main surfaces was measured. The results of measurement are represented as waveform data as shown in FIG. 3. The number of times the amount of shift in any direction of the normal line with respect to the center at which the outer circumferential edge portion of the substrate has an amount of shift of zero was 0.2 mm or more is counted from this waveform data, and evaluation was made based on evaluation criteria described below. In the example shown in FIG. 3, the counted number was four. Because the smaller the counted number is, the smaller the number of times the substrate 1 comes into contact with an external member is, it is inferred that, in a magnetic disk in which this substrate 1 is used, the probability of a problem occurring after an HDD is activated decreases, and the lifespan of the HDD is extended.

5 times or more . . . x (not acceptable)
3 to 4 times . . . ◯ (good: acceptable)
2 times or less . . . ⊚ (excellent: acceptable)
The results of evaluation are shown in Table 2.

TABLE 2

| | T (mm) | D (mm) | 0.0082/ T − 0.0015 (mm) | 0.0094/T (mm) | Results of Evaluation |
|---|---|---|---|---|---|
| Ex. 1 | 0.700 | 0.006 | 0.010 | 0.013 | X |
| Ex. 2 | 0.700 | 0.011 | 0.010 | 0.013 | ◯ |
| Ex. 3 | 0.700 | 0.014 | 0.010 | 0.013 | ⊚ |

TABLE 2-continued

| T (mm) | D (mm) | 0.0082/T − 0.0015 (mm) | 0.0094/T (mm) | Results of Evaluation |
|---|---|---|---|---|
| Ex. 4 | 0.640 | 0.007 | 0.011 | 0.015 | X |
| Ex. 5 | 0.640 | 0.012 | 0.011 | 0.015 | ○ |
| Ex. 6 | 0.640 | 0.015 | 0.011 | 0.015 | ◎ |
| Ex. 7 | 0.520 | 0.010 | 0.014 | 0.018 | X |
| Ex. 8 | 0.520 | 0.014 | 0.014 | 0.018 | ○ |
| Ex. 9 | 0.520 | 0.018 | 0.014 | 0.018 | ◎ |
| Ex. 10 | 0.400 | 0.014 | 0.019 | 0.024 | X |
| Ex. 11 | 0.400 | 0.019 | 0.019 | 0.024 | ○ |
| Ex. 12 | 0.400 | 0.024 | 0.019 | 0.024 | ◎ |
| Ex. 13 | 0.635 | 0.008 | 0.011 | 0.015 | X |
| Ex. 14 | 0.635 | 0.012 | 0.011 | 0.015 | ○ |
| Ex. 15 | 0.635 | 0.015 | 0.011 | 0.015 | ◎ |
| Ex. 16 | 0.500 | 0.011 | 0.015 | 0.019 | X |
| Ex. 17 | 0.500 | 0.015 | 0.015 | 0.019 | ○ |
| Ex. 18 | 0.500 | 0.019 | 0.015 | 0.019 | ◎ |
| Ex. 19 | 0.381 | 0.015 | 0.020 | 0.025 | X |
| Ex. 20 | 0.381 | 0.020 | 0.020 | 0.025 | ○ |
| Ex. 21 | 0.381 | 0.025 | 0.020 | 0.025 | ◎ |

Examples 1, 4, 7, 10, 13, 16, and 19 shown in Table 2 are comparative examples, and examples other than these examples are working examples.

In a case where a substrate has a thickness T of 0.381 to 0.700 mm, in the examples 1 to 21 shown in Table 2, examples other than the examples, 1, 4, 7, 10, 13, 16, and 19 satisfied D≥0.0082/T−0.0015, and the results of evaluation were all acceptable.

Also, the results of evaluation of the examples 3, 6, 9, 12, 15, 18, and 21 satisfying D≥0.0094/T were excellent.

Experimental Example 2

In order to examine the effects of the substrate 1 in which a glass material is used in the substrate main body 3, various substrates were produced (examples 22 to 30).

The above-described glass 1 was used as a glass material. Also, similarly to Experimental Example 1, the film 4 was formed using an electroless plating method, using an Ni—P alloy (P: 10 mass %, the remaining portion was Ni), in a manner similar to that of Experimental Example 1, and then, similarly to Experimental Example 1, main surfaces thereof on both sides were polished using a double-side polishing apparatus, and the thickness of the film 4 on each main surface was adjusted.

With regard to evaluation, the counted number was evaluated using the same evaluation method as that of Experimental Example 1.

The results of evaluation are shown in Table 3.

TABLE 3

| T (mm) | D (mm) | 0.0082/T − 0.0015 (mm) | 0.0094/T (mm) | Results of Evaluation |
|---|---|---|---|---|
| Ex. 22 | 0.640 | 0.007 | 0.011 | 0.015 | X |
| Ex. 23 | 0.640 | 0.012 | 0.011 | 0.015 | ○ |
| Ex. 24 | 0.640 | 0.015 | 0.011 | 0.015 | ◎ |
| Ex. 25 | 0.520 | 0.010 | 0.014 | 0.018 | X |
| Ex. 26 | 0.520 | 0.014 | 0.014 | 0.018 | ○ |
| Ex. 27 | 0.520 | 0.018 | 0.014 | 0.018 | ◎ |
| Ex. 28 | 0.400 | 0.014 | 0.019 | 0.024 | X |
| Ex. 29 | 0.400 | 0.019 | 0.019 | 0.024 | ○ |
| Ex. 30 | 0.400 | 0.024 | 0.019 | 0.024 | ◎ |

In the examples 22 to 30 shown in Table 2, the examples 22, 25, and 28 were comparative examples, and the examples 23, 24, 26, 27, 29, and 30 were all working examples.

In a case where a substrate has a thickness T of 0.400 to 0.640 mm, examples other than the examples 22, 25, and 28 satisfied D≥0.0082/T−0.0015, and the results of evaluation were all acceptable.

Also, the results of evaluation of the examples 24, 27, and 30 satisfying D≥0.0094/T were excellent.

According to the above-described results of evaluation, the effects of the substrate 1 are clear.

Experimental Example 3

Substrates 1 in which the surface roughness maximum height Rz of the outer circumferential edge surface of the substrate main body 3 forming an interface with the film 4 was adjusted in various ways were produced, and the effects of the maximum height Rz were examined by performing a separation test (examples 31 to 39).

An aluminum alloy (Al—Mg alloy) used in Experimental Example 1 was used in the substrate main body 3. The film 4 was formed using the same method as that of Experimental Example 1 such that an Ni—P alloy (P: 10 mass %, the remaining portion was Ni) covered all of the surfaces of the substrate main body 3 at an equal film thickness. The maximum height Rz of the outer circumferential edge surface of the substrate 1 was adjusted by changing the size of abrasive particles included in a formed grindstone used in edge surface grinding, or the size of polishing abrasive particles used in edge surface polishing performed thereafter. Note that, if the surface roughness of the outer circumferential edge surface of the substrate main body 3 forming the interface with the film 4 is adjusted in various ways, surface roughness of the film 4 formed on the outer circumferential edge surface of the substrate 1 also changes (e.g., if roughness of the interface between the substrate main body 3 and the film 4 is increased, surface roughness of the film 4 on the surface side of the substrate 1 also increases), but the surface roughness maximum height Rz of the film 4 formed on the outer circumferential edge surface of the substrate 1 was adjusted through edge surface polishing as appropriate to 0.5 μm or less.

A separation test was performed on the film 4 formed on the outer circumferential edge surface of the produced substrate 1. The substrate 1 in which the film 4 formed on the outer circumferential edge surface easily separates therefrom is not preferable from the viewpoint of long-term reliability of an HDD. That is, if the film 4 formed on the outer circumferential edge surface has partially separated therefrom, there is a risk that the effect of connecting and linking the films 4 on main surfaces on both sides of the substrate 1 will be reduced, and the vibration suppression effect will deteriorate.

In the separation test, a scratched region in which five scratches extending in the thickness direction are provided at 1-mm intervals in a continuous manner in the circumferential direction of a side wall surface of the outer circumferential edge surface was formed using a diamond pen on the film 4 formed on the side wall surface, and a piece of adhesive tape was pressed against this scratched region, the adhesive tape was peeled off, and the surface of the film 4 after the adhesive tape was peeled off was observed using a microscope, and thus the degree of separation of the film 4 was evaluated. The scratched region was provided at 12 positions every 30 degrees on the outer circumferential edge surface, the degree of separation of the film 4 was examined at each region, and regions where separation of the film 4 occurred were counted. Note that a case where the film 4 has started to separate was also counted as the occurrence of separation, and results were classified as follows.

Level 1: the film 4 separated at 10 or more positions.
Level 2: the film 4 separated at 7 to 9 positions.
Level 3: the film 4 separated at 4 to 6 positions.
Level 4: the film 4 separated at 0 to 3 positions.

The results of evaluation are shown in Table 4 below. Examples 6, 9, and 12 shown in Table 4 were the examples 6, 9, and 12 in Experimental Example 1, and the maximum height Rz of the interface between the substrate main body 3 and the film 4 in all of the examples 6, 9, and 12 was 0.1 μm. Also, with regard to surface roughness of the films 4 formed on the outer circumferential edge surfaces (that is, surface roughness of the substrates 1) of the examples 6, 9, and 12 shown in Table 4, the films 4 each had a maximum height Rz of 0.1 μm, and with regard to the examples 31 to 39, the films 4 each had a maximum height Rz of 0.5 μm.

TABLE 4

|  | T (mm) | D (mm) | Max. Height Rz of Interface between Substrate Main Body 3 and Film 4 (μm) | Evaluation in Separation Test |
|---|---|---|---|---|
| Ex. 6 | 0.640 | 0.012 | 0.1 | Level 1 |
| Ex. 31 |  |  | 0.5 | Level 2 |
| Ex. 32 |  |  | 1 | Level 3 |
| Ex. 33 |  |  | 1.5 | Level 4 |
| Ex. 9 | 0.520 | 0.018 | 0.1 | Level 1 |
| Ex. 34 |  |  | 0.5 | Level 2 |
| Ex. 35 |  |  | 1 | Level 3 |
| Ex. 36 |  |  | 1.5 | Level 4 |
| Ex. 12 | 0.400 | 0.024 | 0.1 | Level 1 |
| Ex. 37 |  |  | 0.5 | Level 2 |
| Ex. 38 |  |  | 1 | Level 3 |
| Ex. 39 |  |  | 1.5 | Level 4 |

According to the results shown in Table 4, it is understood that separation resistance is improved by setting the maximum height Rz to 0.5 μm or more, regardless of the thicknesses T and D. It is understood that, in particular, separation resistance is further improved by setting the maximum height Rz to 1.0 μm or more, and separation resistance is much further improved by setting the maximum height Rz to 1.5 μm or more.

According to the above-described results of evaluation, the effects of the maximum height Rz are clear.

As described above, although a substrate for a magnetic disk and a magnetic disk according to the present invention have been described in detail, the present invention is not limited to the above-described embodiment and examples etc., and it will be appreciated that various improvements and modifications can be made without departing from the gist of the present invention.

The invention claimed is:

1. A substrate for a magnetic disk, the substrate comprising:
a substrate main body having two main surfaces; and
a film that is provided on the main surfaces and is made of an Ni—P alloy,
wherein the substrate for a magnetic disk including the film has a thickness T of 0.700 mm or less, and
a total thickness D (mm) of the film provided on the main surfaces and the thickness T (mm) of the substrate for a magnetic disk including the film satisfy Equation (1) below, $$D \geq 0.0082/T - 0.0015 \tag{1},$$

the film is provided to cover all surfaces of the substrate,
a film thickness of the film provided on an edge surface of the substrate is larger than a film thickness of the film provided on the main surfaces, and
the film is provided such that the film thickness on the edge surface is 110% or more of the film thickness on the main surfaces.

2. The substrate for a magnetic disk according to claim 1, wherein the film is formed on the main surfaces and an outer circumferential edge surface of the substrate main body, and
a surface roughness maximum height Rz of the film formed on the outer circumferential edge surface of the substrate for a magnetic disk is smaller than a surface roughness maximum height Rz of the substrate main body at the outer circumferential edge surface of the substrate main body.

3. The substrate for a magnetic disk according to claim 1, wherein the thickness D (mm) of the film and the thickness T (mm) of the substrate including the film satisfy Equation (2) below, $$D \geq 0.0094/T \tag{2}.$$

4. The substrate for a magnetic disk according to claim 1, wherein the substrate for a magnetic disk has a disk shape, and
the disk shape has an outer diameter of 90 mm or more,
the substrate for a magnetic disk including the film has a thickness T of 0.700 mm or less, and
the film is provided such that, when an impact is applied under conditions of 120 (G) and 2 (msec) in a normal direction of the main surfaces in a state in which an inner circumferential portion of the substrate is fixed, the number of times an amount of shift caused by vibration of an outer circumferential edge portion of the substrate in a thickness direction of the substrate is 0.2 mm or more is four or less.

5. The substrate for a magnetic disk according to claim 1, wherein the substrate has a thickness T of 0.640 mm or less.

6. The substrate for a magnetic disk according to claim 1, wherein the substrate has a thickness T of 0.520 mm or less.

7. The substrate for a magnetic disk according to claim 1, wherein the film has a Vickers hardness Hv of 100 (kgf/mm$^2$) or more.

8. A magnetic disk, wherein a surface of the substrate for a magnetic disk according to claim 1 has at least a magnetic film.

9. The substrate for a magnetic disk according to claim 1, wherein the substrate has a thickness T of 0.570 mm or less.

10. A substrate for a magnetic disk, the substrate comprising:
a substrate main body having two main surfaces; and
a film that is provided on the main surfaces and is made of an Ni—P alloy,
wherein the substrate for a magnetic disk including the film has a thickness T of 0.700 mm or less, and
a total thickness D (mm) of the film provided on the main surfaces and the thickness T (mm) of the substrate for a magnetic disk including the film satisfy Equation (1) below, $$D \geq 0.0082/T - 0.0015 \tag{1},$$

the film is formed on the main surfaces and an outer circumferential edge surface of the substrate main body, and the outer circumferential edge surface of the substrate main body forming an interface with the film has a surface roughness maximum height Rz of 0.5 μm or more.

11. The substrate for a magnetic disk according to claim 10,
wherein the film is provided to cover all surfaces of the substrate,
a film thickness of the film provided on an edge surface of the substrate is larger than a film thickness of the film provided on the main surfaces, and
the film is provided such that the film thickness on the edge surface is 110% or more of the film thickness on the main surfaces.

12. The substrate for a magnetic disk according to claim 10,
wherein the thickness D (mm) of the film and the thickness T (mm) of the substrate including the film satisfy Equation (2) below, $$D \geq 0.0094/T \tag{2}$$

13. The substrate for a magnetic disk according to claim 10,
wherein the substrate for a magnetic disk has a disk shape, and
the disk shape has an outer diameter of 90 mm or more, the substrate for a magnetic disk including the film has a thickness T of 0.700 mm or less, and
the film is provided such that, when an impact is applied under conditions of 120 (G) and 2 (msec) in a normal direction of the main surfaces in a state in which an inner circumferential portion of the substrate is fixed, the number of times an amount of shift caused by vibration of an outer circumferential edge portion of the substrate in a thickness direction of the substrate is 0.2 mm or more is four or less.

14. A magnetic disk,
wherein a surface of the substrate for a magnetic disk according to claim 10 has at least a magnetic film.

15. A substrate for a magnetic disk, the substrate comprising:
a substrate main body having two main surfaces; and
a film that is provided on the main surfaces and is made of an Ni—P alloy,
wherein the substrate for a magnetic disk including the film has a thickness T of 0.700 mm or less, and
a total thickness D (mm) of the film provided on the main surfaces and the thickness T (mm) of the substrate for a magnetic disk including the film satisfy Equation (1) below, $$D \geq 0.0082/T - 0.0015 \tag{1}$$

the film is formed on the main surfaces and an outer circumferential edge surface of the substrate main body, and
a surface roughness maximum height Rz of the film formed on the outer circumferential edge surface of the substrate for a magnetic disk is smaller than a surface roughness maximum height Rz of the substrate main body at the outer circumferential edge surface of the substrate main body.

16. The substrate for a magnetic disk according to claim 15,
wherein the film is formed on the main surfaces and an outer circumferential edge surface of the substrate main body, and
the outer circumferential edge surface of the substrate main body forming an interface with the film has a surface roughness maximum height Rz of 0.5 μm or more.

17. The substrate for a magnetic disk according to claim 16,
wherein the film is provided to cover all surfaces of the substrate,
a film thickness of the film provided on an edge surface of the substrate is larger than a film thickness of the film provided on the main surfaces, and
the film is provided such that the film thickness on the edge surface is 110% or more of the film thickness on the main surfaces.

18. The substrate for a magnetic disk according to claim 15,
wherein the thickness D (mm) of the film and the thickness T (mm) of the substrate including the film satisfy Equation (2) below, $$D \geq 0.0094/T \tag{2}$$

19. The substrate for a magnetic disk according to claim 15,
wherein the substrate for a magnetic disk has a disk shape, and
the disk shape has an outer diameter of 90 mm or more, the substrate for a magnetic disk including the film has a thickness T of 0.700 mm or less, and
the film is provided such that, when an impact is applied under conditions of 120 (G) and 2 (msec) in a normal direction of the main surfaces in a state in which an inner circumferential portion of the substrate is fixed, the number of times an amount of shift caused by vibration of an outer circumferential edge portion of the substrate in a thickness direction of the substrate is 0.2 mm or more is four or less.

20. A magnetic disk,
wherein a surface of the substrate for a magnetic disk according to claim 15 has at least a magnetic film.

* * * * *